(12) United States Patent
Frank

(10) Patent No.: US 10,869,284 B2
(45) Date of Patent: *Dec. 15, 2020

(54) METHOD AND APPARATUS FOR DETERMINING PER CARRIER ADDITIONAL MAXIMUM POWER REDUCTION FOR DUAL CARRIER OPERATION

(71) Applicant: Lenovo (Singapore) Pte. Ltd., New Tech Park (SG)

(72) Inventor: Colin Frank, Park Ridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,539

(22) Filed: Aug. 10, 2019

(65) Prior Publication Data

US 2020/0053668 A1 Feb. 13, 2020

Related U.S. Application Data

(60) Provisional application No. 62/717,561, filed on Aug. 10, 2018.

(51) Int. Cl.
| | | |
|---|---|---|
| *H04W 52/00* | (2009.01) | |
| *H04W 72/00* | (2009.01) | |
| *H04W 52/36* | (2009.01) | |
| *H04W 52/14* | (2009.01) | |
| *H04W 52/24* | (2009.01) | |
| *H04W 52/34* | (2009.01) | |
| *H04W 72/02* | (2009.01) | |

(52) U.S. Cl.
CPC ....... *H04W 52/367* (2013.01); *H04W 52/146* (2013.01); *H04W 52/241* (2013.01); *H04W 52/34* (2013.01); *H04W 72/02* (2013.01)

(58) Field of Classification Search
CPC ... H04W 52/34; H04W 52/38; H04W 52/243; H04W 52/346; H04W 52/367;
(Continued)

(56) References Cited

U.S. PATENT DOCUMENTS 9,020,556 B2 * 4/2015 Haim ............... H04W 52/365
455/522
9,025,478 B2 * 5/2015 Jung ............... H04W 72/082
370/252

(Continued)

OTHER PUBLICATIONS

PCT International Search Report for PCT/IB2019/056823, Lenovo (Singapore) Pte. Ltd., dated—Nov. 28, 2019.
(Continued)

*Primary Examiner* — Quochien B Vuong
(74) *Attorney, Agent, or Firm* — Loppnow & Chapa

(57) ABSTRACT

A method and apparatus is provided for determining a per carrier additional maximum power reduction needed by the user equipment in order to meet emission requirements for dual carrier operation of adjacent carriers. A per carrier allowed additional maximum power reduction for each of the carriers is determined in the absence of the shared scheduling information between the adjacent carriers. The determination for each of the carriers for use with the different radio access technologies includes identifying for each carrier a worst case allocation for the other carrier that produces a largest total allowed maximum power reduction necessary for meeting emission requirements relative to a maximum allowed total power, and determining the total allowed maximum power reduction relative to the maximum allowed total power using the worst case allocation. A predetermined partition of the maximum allowed total power to allocate a fraction of the maximum allowed total power is applied to each of the carriers, where the predetermined partition is independent of the identified allocations, and the per carrier additional maximum power reduction is determined as a sum of the total allowed maximum power reduction and a negative of ten times a base ten logarithm of the fraction of the maximum allowed total (Continued)

power allocated to each carrier using the predetermined partition.

20 Claims, 9 Drawing Sheets

(58) Field of Classification Search
CPC .. H04W 72/082; H04W 88/02; H04B 17/345; H04L 5/0007
See application file for complete search history.

(56) References Cited

U.S. PATENT DOCUMENTS

| | | | | |
|---|---|---|---|---|
| 9,763,199 B2* | 9/2017 | Pelletier | ............... | H04W 52/365 |
| 9,807,709 B2* | 10/2017 | Deng | ................... | H04W 52/242 |
| 9,924,515 B2* | 3/2018 | Zhang | ............... | H04W 72/0453 |
| 10,278,137 B2* | 4/2019 | Dinan | ............... | H04W 72/0473 |
| 10,420,161 B1* | 9/2019 | Sava | ..................... | H04W 76/16 |
| 2020/0053665 A1* | 2/2020 | Frank | ................... | H04W 52/38 |

OTHER PUBLICATIONS

Nokia, "A-MPR for DC_(n)71B", R4-1806979, 3GPP TSG-RAN WG4 Meeting #87, Busan, Korea (Republic of), May 21-25, 2018.
Motorola Mobility, "On AMPR for DC_(n)71B without Dynamic Power Sharing", R4-1811319, 3GPP TSG RAN WG4 #88, Gothenburg, Sweden, Aug. 20-25, 2018.
3GPP TS 38.101-3 V15.2.0 (Jun. 2018), 3rd Generation Partnership Project, Technical Specification Group Radio Access Network; NR; User Equipment (UE) radio transmission and reception; Part 3: Range 1 and Range 2 Interworking operation with other radios (Release 15).

* cited by examiner

METHOD AND APPARATUS FOR DETERMINING PER CARRIER ADDITIONAL MAXIMUM POWER REDUCTION FOR DUAL CARRIER OPERATION

FIELD OF THE INVENTION

The present disclosure is directed to a method and apparatus for determining per carrier additional maximum power reduction (A-MPR) including the per carrier additional maximum power reduction for use in contiguous dual carrier operation, such as in bands 71 and n71.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In order to support greater data throughputs, service providers have been increasingly looking at techniques which extend the available bandwidth that is allowed to be used by a particular user within the system. At least a couple of bandwidth extending techniques include the use of carrier aggregation and/or dual carrier, where multiple frequency bands are selected to operate together. For example, by utilizing more than one carrier through carrier aggregation it may be possible to increase the overall transmission bandwidth associated with a particular data channel and correspondingly enhance the data capacity of that channel. Additionally and/or alternatively, a dual or multiple carrier approach can allow two or more spectrum allocations to be paired and/or used in parallel, including spectrum allocations alternatively associated with different standards and/or radio access technologies, which can also be used to support the ability of enhanced and/or more robust data throughput.

Such a possibility might better support the beginning stages of adoption for a particular standard, where area coverage for the emerging standard at least initially may be less than complete. During such a period of transition, it may be beneficial to better support the transition to an emerging standard by allowing bearers for the new standard to be supported in conjunction with the infrastructure of the more mature or previously established standard, and/or to supplement coverage of the emerging standard with coexisting communications using the more established standard.

However, the coexistence of communications via multiple carriers can sometimes result in the mixing in the radio of the two separate sets of signals, whereby intermodulation products from transceiver non-linearity can cause spurious and/or unwanted signaling in unintended signal frequencies. There are limits to the amount of power a device can spill over into an unintended spectrum space, and depending upon how much information is shared between each of the at least two radio access technologies, it may be difficult to predict or control an amount of power produced as part of the resulting intermodulation products. Generally, one technique via which the power in an unintended area of the spectrum can be managed is through an attenuation of the signaling in one or both of the components, which together are contributing to the unwanted emissions. However, it may not always be clear how much attenuation is necessary in instances where the system that is tasked with deciding how much attenuation to apply to itself does not know the exact nature of the other signal associated with the other radio access technology that together is supporting the dual connectivity.

Previously, estimates as to a worst case have been assumed for the signaling of the other radio access technology, and an amount of power reduction is then determined as being necessary to insure avoidance of the unwanted emissions. However excessive power reductions in one or both of the carriers of the dual connectivity can negatively impact the communications associated with the particular carrier. The present inventor has recognized that past estimates have often been overly conservative, and in some instances may have assumed conditions that could not be possible, which in turn may have resulted in significant power reductions being enforced for one or both of the multiple dual connectivity carriers, and that there may be better estimates for a worst case estimate, which may allow the amount of enforced power reduction in a particular one of the multiple carriers contributing to the potential unwanted signaling to be reduced.

SUMMARY

The present application provides a method in a user equipment for determining a per carrier additional maximum power reduction needed by the user equipment in order to meet emission requirements for dual carrier operation of adjacent carriers in absence of shared scheduling information between the adjacent carriers, each carrier having an associated respective one of multiple different radio access technologies. The method includes determining a per carrier allowed additional maximum power reduction for each of the carriers in the absence of the shared scheduling information between the adjacent carriers. The determination for each of the carriers for use with the different radio access technologies includes identifying for each carrier a worst case allocation for the other carrier that produces a largest total allowed maximum power reduction necessary for meeting emission requirements relative to a maximum allowed total power, and determining the total allowed maximum power reduction relative to the maximum allowed total power using the worst case allocation. A predetermined partition of the maximum allowed total power to allocate a fraction of the maximum allowed total power is applied to each of the carriers, where the predetermined partition is independent of the identified allocations, and the per carrier additional maximum power reduction is determined as a sum of the total allowed maximum power reduction and a negative of ten times a base ten logarithm of the fraction of the maximum allowed total power allocated to each carrier using the predetermined partition. The method further includes using the determined per carrier allowed additional maximum power reduction in connection with transmissions when operating in a particular one of the dual carriers corresponding to the associated radio access technology.

According to another possible embodiment, a user equipment in a communication network is provided. The user equipment includes a controller that determines a per carrier allowed additional maximum power reduction for each carrier of a dual carrier operation of adjacent carriers of different radio access technologies in absence of shared scheduling information between the adjacent carriers. The determination for each of the carriers for use with the different radio access technologies includes identifying for each carrier a worst case allocation for the other carrier that produces a largest total allowed power reduction necessary for meeting emission requirements relative to a maximum allowed total power, and determining the allowed total maximum power reduction relative to the maximum allowed total power using the worst case allocation. A predetermined partition of the maximum allowed total power to allocate a fraction of the maximum allowed total power is applied to each of the carriers, where the predetermined partition is independent of the identified allocations, and the per carrier additional maximum power reduction is determined as a sum of the total allowed maximum power reduction and a negative of ten times a base ten logarithm of the fraction of the maximum allowed total power allocated to the carrier using the predetermined partition. The user equipment further includes a transceiver that uses the determined per carrier allowed additional maximum power reduction in connection with transmissions when operating in a particular one of the dual carriers corresponding to the associated radio access technology.

According to a further possible embodiment, a method in a network entity for a first radio access technology in a communication network for determining a per carrier additional maximum power reduction for a first radio access technology carrier of a dual carrier operation user equipment, where the dual carriers are adjacent uplink carriers corresponding to different radio access technologies, and where the network entity does not have knowledge of the uplink allocation for a second radio access technology carrier associated with the dual carrier operation, which is different from the first radio access technology carrier is provided. The method includes determining an allowed total additional maximum power reduction for the first radio access technology carrier relative to a maximum allowed total power without knowledge of the uplink allocation for the second radio access technology carrier. The determination includes identifying a worst case allocation for the second radio access technology carrier that produces a largest total allowed maximum power reduction necessary for meeting emission requirements relative to the maximum allowed total power, and determining the total allowed maximum power reduction relative to the maximum allowed total power using the worst case allocation. A predetermined partition of the maximum allowed total power to allocate a fraction of the maximum allowed total power is applied to each of the carriers, where the predetermined partition is independent of the identified allocations, and the per carrier additional maximum power reduction is determined as a sum of the total allowed maximum power reduction and a negative of ten times a base ten logarithm of the fraction of the maximum allowed total power allocated to the carrier using the predetermined partition. The method further includes using the determined per carrier allowed additional maximum power reduction in connection with the assignment of an allocation and a modulation and coding scheme to the user equipment to be used when transmitting on the first radio access technology carrier.

According to a still further possible embodiment, a network entity for a first radio access technology in a communication network is provided. The network entity includes a controller that determines a per carrier allowed additional maximum power reduction for a first radio access technology carrier of a dual carrier operation user equipment, where the dual carriers are adjacent uplink carriers corresponding to different radio access technologies, and where the network entity does not have knowledge of the uplink allocation for a second radio access technology carrier associated with the dual carrier operation, which is different from the first radio access technology carrier. The determination includes identifying a worst case allocation for the second radio access technology carrier that produces a largest total allowed maximum power reduction necessary for meeting emission requirements relative to a maximum allowed total power, and determining the allowed total maximum power reduction relative to the maximum allowed total power using the worst case allocation. A predetermined partition of the maximum allowed total power is applied to allocate a fraction of the maximum allowed total power to each of the carriers, where the predetermined partition is independent of the identified allocations, and the per carrier additional maximum power reduction is determined as a sum of the total allowed maximum power reduction and a negative of ten times a base ten logarithm of the fraction of the maximum allowed total power allocated to the carrier using the predetermined partition. The network entity further includes a transceiver that uses the determined per carrier allowed additional maximum power reduction in connection with the assignment of an allocation and a modulation and coding scheme to the user equipment to be used when transmitting on the first radio access technology carrier.

These and other features, and advantages of the present application are evident from the following description of one or more preferred embodiments, with reference to the accompanying drawings.

DETAILED DESCRIPTION OF THE PREFERRED EMBODIMENT(S)

Figure 1:
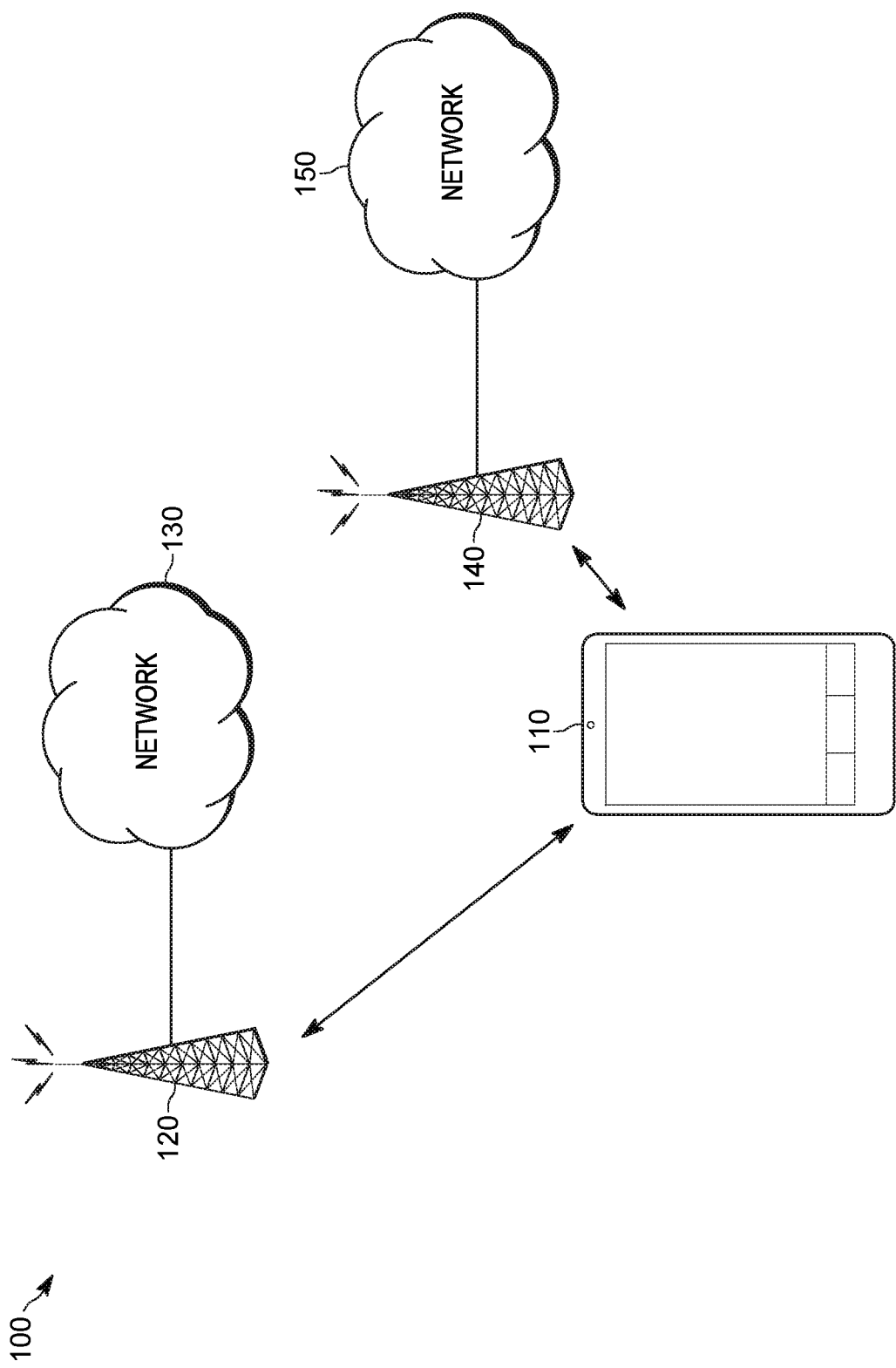
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus including a determination of per carrier additional maximum power reduction for dual carrier operation of adjacent carriers in absence of shared scheduling information between the adjacent carriers.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. In at least some instances, the system can include a second base station 140, which can be used to support access to a second network 150. In some instances, the second base station 140 and second network 150 can support communications using a different radio access technology.

The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The networks 130 and 150 can each include any type of network that is capable of sending and receiving wireless communication signals. For example, the networks 130 and/or 150, can each include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a new radio access technology (NR) network, a 5th generation (5G) network, a 3rd Generation Partnership Project (3GPP)-based network, a satellite communications network, a high altitude platform network, the Internet, and/or other communication networks. Each network will often have its own related supporting infrastructure. Access to both sets of network infrastructure can be used to support dual connectivity.

In some existing solutions, each radio access technology (RAT) scheduler may make two separate assumptions in computing the maximum A-MPR that is needed. When determining the maximum A-MPR that is needed, the scheduler may assume the minimum RB allocation (i.e., 1 RB) for the other RAT when computing the allocation ratio which is then used to determine the needed total A-MPR. Since the total A-MPR decreases when the allocation ratio increases, this may be a worst case assumption. However, this first total A-MPR is the A-MPR that is allowed for the sum power over the two carriers (LTE and NR). In order to determine the fraction of the remaining power allocated to a particular RAT, the RAT scheduler may make a second worst case assumption with respect to the size of the RB allocation on the second RAT. The second worst case assumption is that the RB allocation on the second RAT is the maximum possible. However, this method is problematic in that each RAT scheduler may reserve a large amount of power for the other RAT which is not being used. Correspondingly, the resulting per carrier A-MPR tends to be very large, and much larger than needed. As a result, a large amount of available power may be wasted and in some instances the feature may be unusable.

As such, it may be beneficial to be able to better address an estimation of the A-MPR needed for contiguous Evolved Universal Terrestrial Radio Access (E-UTRA)-NR Dual Connectivity (EN-DC) when scheduling information is not shared between the two RAT's. In particular, this may be relevant for Band 71 for some system integrators.

The per carrier A-MPR for DC_(n)71AA is given as described in Section 6.2B.3.1.1 of TS 38.101-3 as below. For the UE not supporting dynamic power sharing, the A-MPR is given by the following:

for UE not indicating support of dynamic Power Sharing $$A\text{-}MPR_{LTE} = \text{CEIL}\{M_{A,LTE}, 0.5\}$$

$$A\text{-}MPR_{NR} = \text{CEIL}\{M_{A,NR}, 0.5\}$$

where A-MPR is the total power reduction allowed per CG with $$M_{A,LTE} = M_{A,DC}(A_{LTE,wc}) - \Delta_{LTE}$$

$$M_{A,NR} = M_{A,DC}(A_{NR,wc}) - \Delta_{NR}$$

$$A_{LTE,wc} = (L_{CRB,LTE} + 1)/(N_{RB,LTE} + N_{RB,NR})$$

$$A_{NR,wc} = (1 + L_{CRB,NR})/(N_{RB,LTE} + N_{RB,NR})$$

$$\Delta_{LTE} = 10 \log_{10}\{L_{CRB,LTE}/(L_{CRB,LTE} + N_{RB,NR})\}$$

$$\Delta_{NR} = 10 \log_{10}\{L_{CRB,NR}/(N_{RB,LTE} + L_{CRB,NR})\}$$

As defined, the A-MPR for LTE depends on the following two terms $$A_{LTE,wc} = (L_{CRB,LTE} + 1)/(N_{RB,LTE} + N_{RB,NR})$$

$$\Delta_{LTE} = 10 \log_{10}\{L_{CRB,LTE}/(L_{CRB,LTE} + N_{RB,NR})\}$$

The first term $A_{LTE,wc}$ is derived from the allocation ratio $$A = (L_{CRB,LTE} + L_{CRB,NR})/(N_{RB,LTE} + N_{RB,NR})$$

in which $L_{CRB,NR}$ has been set equal to 1. The reason for this substitution is that the total A-MPR is monotonically decreasing with the ratio A. So, the worst-case (largest) total A-MPR results when the allocation ratio A is minimized by setting $L_{CRB,NR}$ equal to 1.

The second term addresses the fact that the total power is shared between the LTE carrier and NR carrier. Thus, the fraction of the power that should be allocated to the LTE carrier is a function of the ratio of the number of LTE RB's to the sum of the number of LTE RB's and the number of NR RB's. Since the fraction of power allocated to the LTE carrier is minimized when this ratio is minimized, the worst-case per carrier A-MPR results when the number of NR RB's is set equal to $N_{RB,NR}$, which is the maximum number of RB's for the NR carrier.

The problem with the approach taken in the specification is that it is overly pessimistic in that the worst-case situation used to compute A-MPR is not actually feasible; that is, it is not possible for $L_{CRB,NR}$ to be equal to both 1 and $N_{RB,NR}$, simultaneously. In fact, the worst-case A-MPR that is achievable results when $L_{CRB,NR}$ is chosen so as to maximize.

$$\max_{L_{CRB,NR} \leq N_{RB,NR}} \left\{ M_{A,DC}\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right) \right\}$$

In Appendix 1, it is shown, for both OFDM and DFT-S-OFDM, that the above expression is maximized when $L_{CRB,NR} = N_{RB,NR}$, which leads to the following embodiment.

First Embodiment

The A-MPR for DC_(n)71AA without dynamic power sharing is defined as $$M_{A,LTE} = M_{A,DC}\left(\frac{L_{CRB,LTE} + N_{RB,NR}}{N_{RB,LTE} + N_{RB,NR}}\right) - 10\log_{10}\left(\frac{L_{CRB,LTE}}{L_{CRB,LTE} + N_{RB,NR}}\right),$$

and $$M_{A,NR} = M_{A,DC}\left(\frac{L_{CRB,NR} + N_{RB,LTE}}{N_{RB,LTE} + N_{RB,NR}}\right) - 10\log_{10}\left(\frac{L_{CRB,NR}}{L_{CRB,NR} + N_{RB,LTE}}\right).$$

Figure 2:
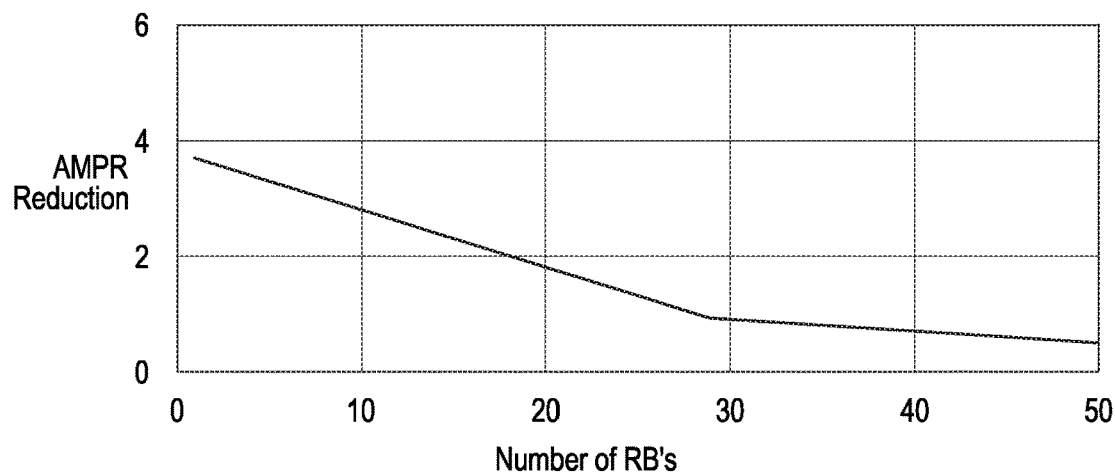
FIG. 2 is an exemplary graph of additional maximum power reduction (A-MPR) vs. number of resource blocks (RB's) for orthogonal frequency division multiplexing (OFDM), in accordance with a first embodiment.

FIG. 2 illustrates an exemplary graph 200 of additional maximum power reduction (A-MPR) vs. number of resource blocks (RB's) for orthogonal frequency division multiplexing (OFDM), in accordance with a first embodiment. In FIG. 2, we plot the difference between the A-MPR currently in the specification and the A-MPR in accordance with the first embodiment as a function of the allocation ratio for $N_{RB,LTE} = N_{RB,NR} = 50$.

Figure 3:
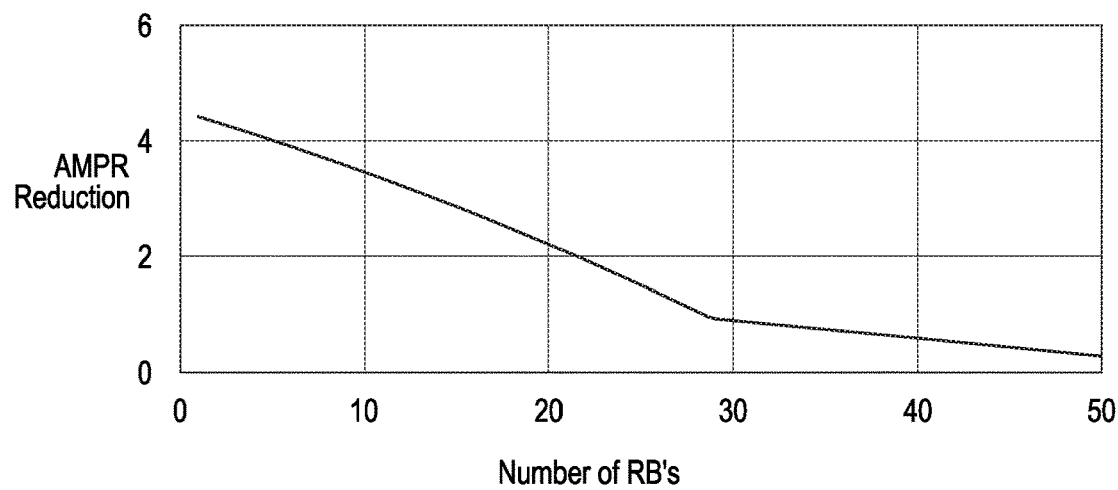
FIG. 3 is an exemplary graph of A-MPR reduction vs. number of RB's for discrete Fourier transform spread orthogonal frequency division multiplexing (DFT-S-OFDM), in accordance with a first embodiment.

FIG. 3 illustrates an exemplary graph 300 of A-MPR reduction vs. number of RB's for discrete Fourier transform spread orthogonal frequency division multiplexing (DFT-S-OFDM), in accordance with a first embodiment. In FIG. 3, we plot the difference between the A-MPR currently in the specification and the A-MPR in accordance with the first embodiment as a function of the allocation ratio for $N_{RB,LTE} = N_{RB,NR} = 50$.

From the above analysis, it can be seen that the worst case A-MPR can be reduced by maximizing the A-MPR over worst case allocations which are actually feasible as in accordance with the first embodiment.

Figure 4:
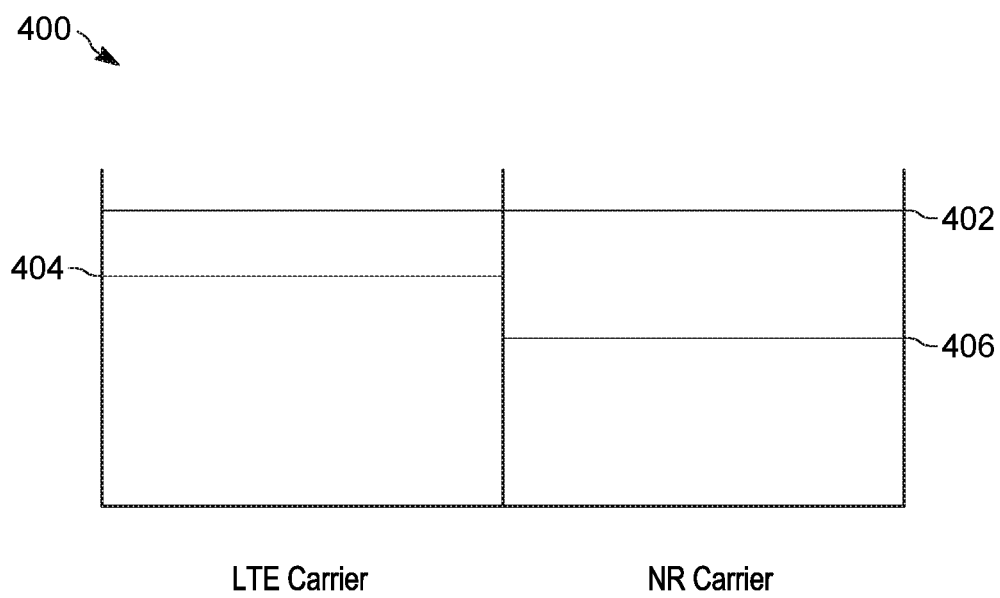
FIG. 4 is an exemplary graph of maximum power spectral density with and without dynamic power sharing, in accordance with a first embodiment.

It can also be shown that the A-MPR in the first embodiment has the beneficial property that the maximum power spectral densities of both the LTE and NR carriers without dynamic power sharing will be less than the maximum average power spectral density (PSD) of these carriers with dynamic power sharing. This property is shown to be satisfied in Appendix 2 and is illustrated in FIG. 4, where FIG. 4 illustrates an exemplary graph 400 of maximum power spectral density with and without dynamic power sharing, where with proposed A-MPR, maximum PSD is reduced in the absence of dynamic power sharing.

Level 402 represents an exemplary maximum PSD with dynamic power sharing, which depends on both $L_{CRB,NR}$ and $L_{CRB,LTE}$. Level 404 represents an exemplary maximum PSD without dynamic power sharing, which depends only on $L_{CRB,LTE}$. Level 406 represents an exemplary maximum PSD without dynamic power sharing, which depends only on $L_{CRB,NR}$. With the first embodiment, the maximum PSD of both the LTE and the NR carrier is less than the average PSD with dynamic power sharing.

This property is beneficial if the equal PSD case is not the worst case with respect to meeting emissions requirements. Since equal PSD was used to derive the power sharing A-MPR in 6.2B.3.1.1, it should still be possible to meet emissions requirements if the PSD of both carriers is reduced relative to the equal PSD that was sufficient to meet the emissions requirements.

An Alternative Method for Defining A-MPR for DC_(n)71

The formulation in the above noted first embodiment meaningfully reduces A-MPR, but we now consider whether it is possible to reduce A-MPR further. An issue with the existing formulation of A-MPR for dynamic power sharing for DC_(n)71 is that the A-MPR can be very large and the reason for this is that each carrier reserves a large amount of power for the other carrier that cannot be used.

To illustrate we consider an example in which both the LTE and NR carriers have a bandwidth of 10 MHz so that the number of RB's is $N_{RB,LTE} = N_{RB,NR} = 50$ (assumes a subcarrier spacing of 15 kHz for the NR carrier). With the current A-MPR formulation, the A-MPR for the LTE carrier can be expressed as $$M_{A,DC}\left(\frac{L_{CRB,LTE} + 1}{N_{RB,LTE} + N_{RB,NR}}\right) - 10\log_{10}\left(\frac{L_{CRB,LTE}}{L_{CRB,LTE} + N_{RB,NR}}\right)$$

while the A-MPR for the NR carrier can similarly be expressed as $$M_{A,DC}\left(\frac{1 + L_{CRB,NR}}{N_{RB,LTE} + N_{RB,NR}}\right) - 10\log_{10}\left(\frac{L_{CRB,LTE}}{N_{RB,LTE} + L_{CRB,NR}}\right).$$

For the LTE carrier, the worst case remaining power that is available is determined by subtracting $$M_{A,DC}\left(\frac{L_{CRB,LTE} + 1}{N_{RB,LTE} + N_{RB,NR}}\right)$$

from $P_{EN-DC}$. From this worst case remaining power, the LTE carrier reserves a fraction equal to $$\frac{N_{RB,NR}}{L_{CRB,LTE} + N_{RB,NR}}$$

for the NR carrier. Similarly, the NR carrier determines the worst case remaining power for the NR carrier by subtracting $$M_{A,DC}\left(\frac{L_{CRB,NR}+1}{N_{RB,LTE}+N_{RB,NR}}\right)$$

from $P_{EN-DC}$. From this worst-case remaining power, the NR carrier reserves a fraction equal to $$\frac{N_{RB,LTE}}{N_{RB,LTE}+N_{CRB,NR}}$$

for the LTE carrier.

Now consider the case in which $L_{CRB,LTE}=L_{CRB,NR}=1$. For this case we have $$M_{A,DC}\left(\frac{2}{50+50}\right)=9.8 \text{ dB}$$

and the remaining power computed by the LTE carrier is equal to the remaining power computed by the NR carrier. Of the remaining power, the LTE carrier reserves a fraction equal to $$\left(\frac{50}{50+1}\right)\cdot 100 = 98\%$$

for the NR carrier, while the NR carrier reserves 98% of its remaining power for the LTE carrier. So each carrier reserves 98% of its remaining power for the other carrier, while each carrier actually uses only 2% of the remaining power (=1/51). As a result, 96% of the remaining power is wasted in this example, and this corresponds to a total A-MPR of 23.8 dB (9.8−10*log 10(0.04)).

To illustrate the magnitude of the problem, we define the combined A-MPR in terms of the power remaining after each carrier applies non-dynamic power sharing A-MPR. The combined A-MPR can be expressed as $$\text{combined } A\text{-}MPR = \\ \left\{ 10^{\frac{1}{10}\left(-M_{A,DC}\left(\frac{L_{CRB,LTE}+1}{N_{RB,LTE}+N_{RB,NR}}\right)+10\log_{10}\left(\frac{L_{CRB,LTE}}{L_{CRB,LTE}+N_{RB,NR}}\right)\right)} + \right.\\ \left. 10^{\frac{1}{10}\left(-M_{A,DC}\left(\frac{L_{CRB,NR}+1}{N_{RB,LTE}+N_{RB,NR}}\right)+10\log_{10}\left(\frac{L_{CRB,NR}}{L_{CRB,NR}+N_{RB,LTE}}\right)\right)} \right\}$$

The combined A-MPR is plotted in the below figure for OFDM and it can be observed that the values can be as large as 24 dB. We then compare this combined A-MPR with the dynamic power sharing A-MPR given by $$M_{A,DC}\left(\frac{L_{CRB,LTE}+L_{CRB,NR}}{N_{RB,LTE}+N_{RB,NR}}\right).$$

We define the A-MPR penalty as the difference given by $$AMPR \text{ penalty} = \\ -10\log_{10}\left( \begin{array}{l} 10^{\frac{1}{10}\left(-M_{A,DC}\left(\frac{L_{CRB,LTE}+1}{N_{RB,LTE}+N_{RB,NR}}\right)+10\log_{10}\left(\frac{L_{CRB,LTE}}{L_{CRB,LTE}+N_{RB,NR}}\right)\right)} + \\ 10^{\frac{1}{10}\left(-M_{A,DC}\left(\frac{L_{CRB,NR}+1}{N_{RB,LTE}+N_{RB,NR}}\right)+10\log_{10}\left(\frac{L_{CRB,NR}}{L_{CRB,NR}+N_{RB,LTE}}\right)\right)} \end{array} \right). \\ -M_{A,DC}\left(\frac{L_{CRB,LTE}+L_{CRB,NR}}{N_{RB,LTE}+N_{RB,NR}}\right)$$

where the A-MPR penalty is the additional A-MPR that is needed when dynamic power sharing is not supported. The A-MPR penalty is shown in in FIGS. 5 and 6 and it can be observed that the A-MPR penalty for non-dynamic power sharing is as large as 14 dB.

Figure 5:
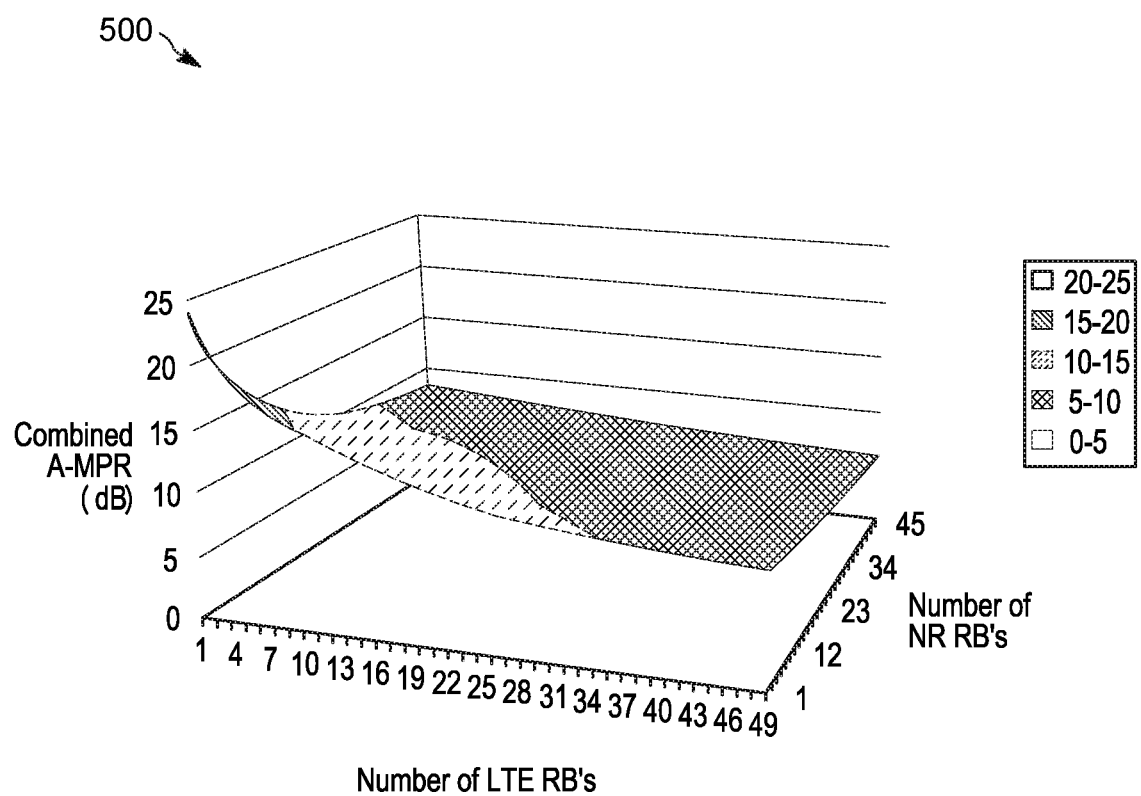
FIG. 5 is an exemplary graph of total A-MPR for OFDM with non-dynamic power sharing.

FIG. 5 illustrates an exemplary graph 500 of the combined A-MPR for OFDM with non-dynamic power sharing.

Figure 6:
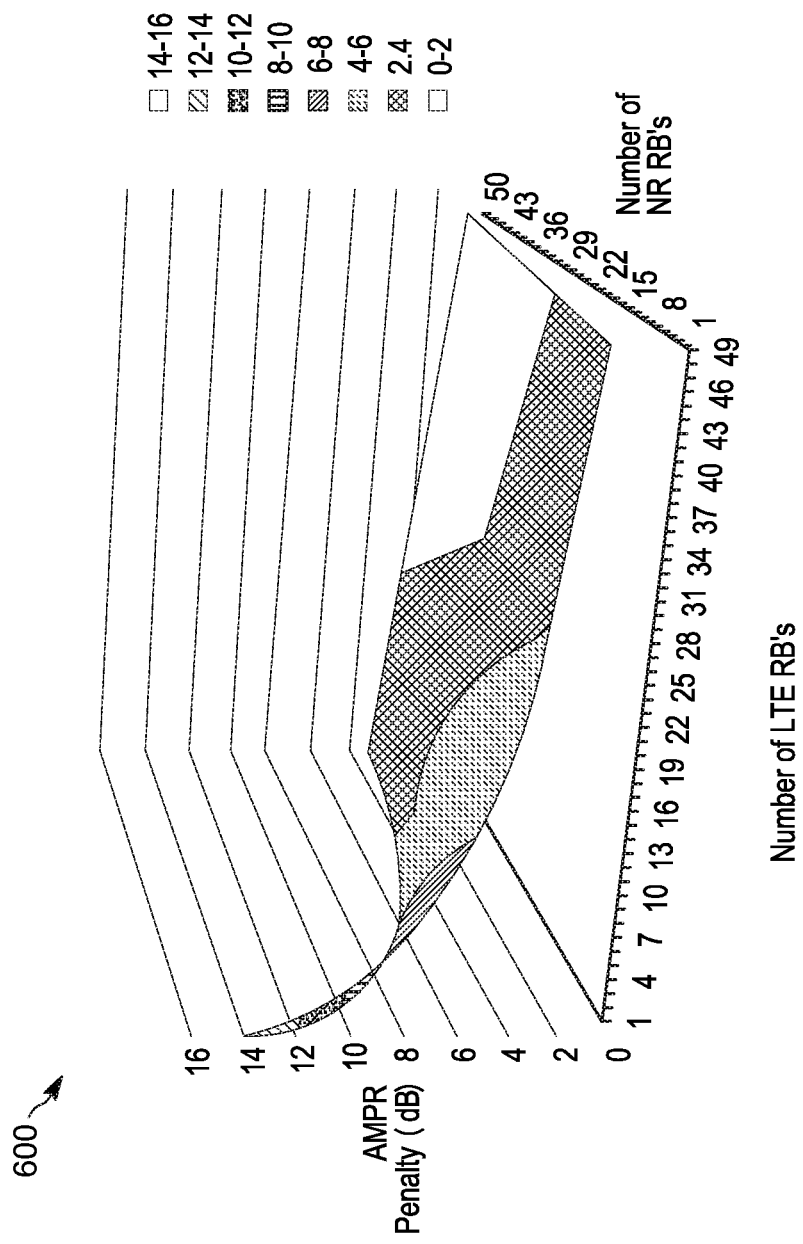
FIG. 6 is an exemplary graph of A-MPR penalty for OFDM with non-dynamic power sharing.

FIG. 6 illustrates an exemplary graph 600 of A-MPR penalty for OFDM with non-dynamic power sharing.

At least one concern with the existing approach is that each carrier reserves a large amount of power for the other carrier that is never used. In general, there is no point in the first carrier reserving more than one-half of its remaining power for the second carrier at the same time the second carrier is reserving more than one-half of its remaining power for the first carrier. As a result, we explore further embodiments, as noted below.

In accordance with a first further embodiment, the A-MPR for DC_(n)71AA without dynamic power sharing is defined as $$M_{A,LTE} = \\ M_{A,DC}\left(\frac{L_{CRB,LTE}+1}{N_{RB,LTE}+N_{RB,NR}}\right) - 10\log_{10}\left(\frac{N_{RB,LTE}}{N_{RB,LTE}+N_{RB,NR}}\right),$$

and $$M_{A,NR} = M_{A,DC}\left(\frac{L_{CRB,NR}+1}{N_{RB,LTE}+N_{RB,NR}}\right) - 10\log_{10}\left(\frac{N_{RB,NR}}{N_{RB,LTE}+N_{RB,NR}}\right).$$

In accordance with a second further embodiment, the A-MPR for DC_(n)71AA without dynamic power sharing is defined as $$M_{A,LTE} = M_{A,DC}\left(\frac{L_{CRB,LTE}+1}{N_{RB,LTE}+N_{RB,NR}}\right) + 3, \text{ and}$$

$$M_{A,NR} = M_{A,DC}\left(\frac{L_{CRB,NR}+1}{N_{RB,LTE}+N_{RB,NR}}\right) + 3.$$

Both further embodiments have the property that the combined A-MPR exceeds the A-MPR for dynamic power sharing. In the first further embodiment, each carrier scales the total remaining power by its fraction of the total bandwidth with expectation that allocating power in proportion to bandwidth will maximize the total throughput. In the second further embodiment, each carrier takes one-half of the remaining power with the advantage that this will better maximize the power available for a single RB during transmission of the PUCCH.

Figure 7:
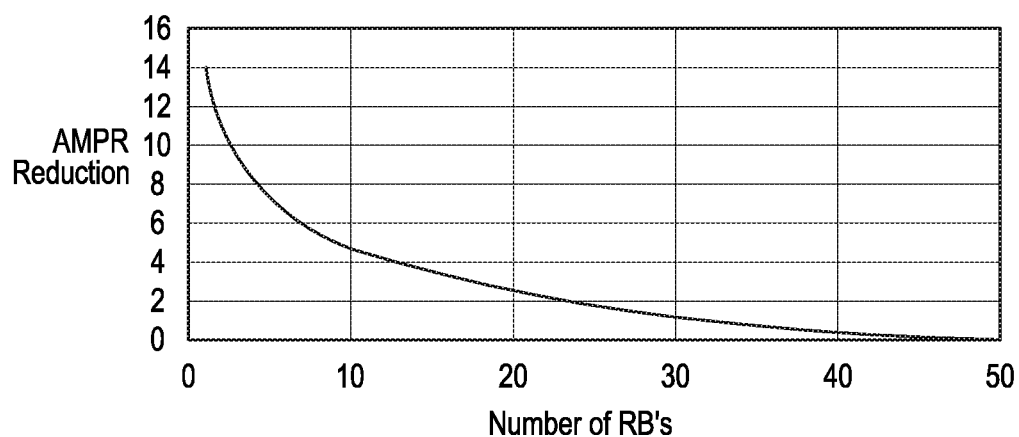
FIG. 7 is an exemplary graph of A-MPR vs. number of RB's for orthogonal frequency division multiplexing (OFDM), in accordance with further embodiments.
Figure 8:
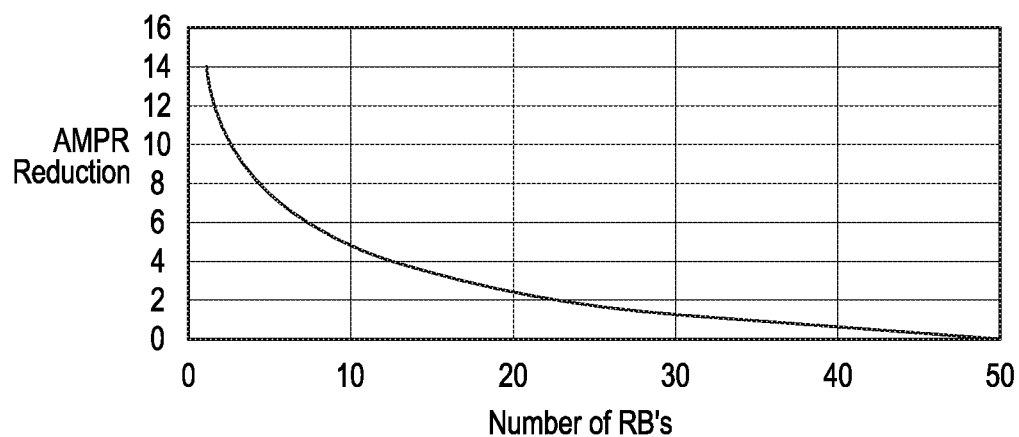
FIG. 8 is an exemplary graph of A-MPR reduction vs. number of RB's for DFT-S-OFDM, in accordance with further embodiments.

The A-MPR reduction for the further embodiments for OFDM and DFT-S-OFDM is shown in FIGS. 7 and 8, respectively and is meaningful. For this example, it can be noted that the first and second further embodiments are equivalent since $N_{RB,LTE}=N_{RB,NR}=50$. The A-MPR penalty for the further embodiments shown in FIG. 7, is greatly reduced from the A-MPR penalty shown in the corresponding figure above for the A-MPR currently in the specification, and in all cases is less than 2 dB.

Figure 9:
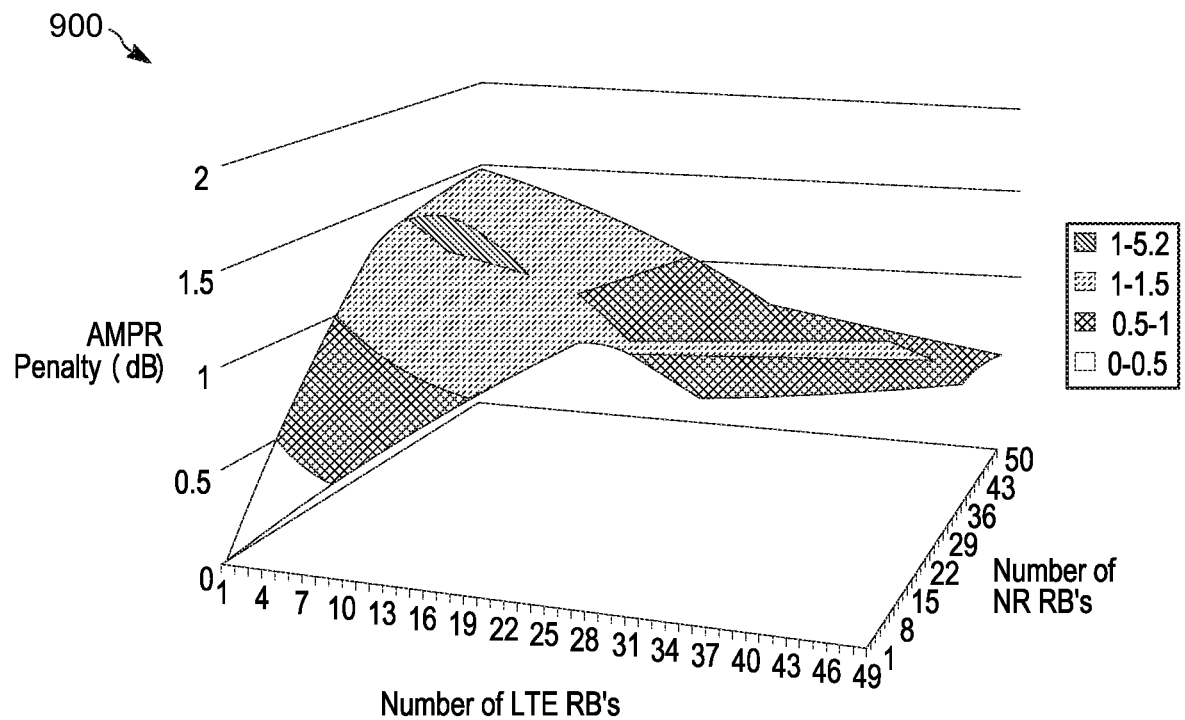
FIG. 9 is an exemplary graph of A-MPR penalty for OFDM with non-dynamic power sharing, in accordance with further embodiments.

More specifically, FIG. 7 illustrates an exemplary graph 700 of A-MPR vs. number of RB's for orthogonal frequency division multiplexing (OFDM), in accordance with the further embodiments. FIG. 8 illustrates an exemplary graph 800 of A-MPR reduction vs. number of RB's for DFT-S-OFDM, in accordance with the further embodiments. FIG. 9 illustrates an exemplary graph 900 of A-MPR penalty for OFDM with non-dynamic power sharing, in accordance with the further embodiments.

As mentioned previously, simulations with equal PSD for the NR and LTE carriers were used to derive the power sharing A-MPR in 6.2B.3.1.1 with the assumption that equal PSD is the worst case. As shown in Appendix 2, the A-MPR in the first embodiment has the property that the maximum power spectral densities of both the LTE and NR carriers without dynamic power sharing will be less than the maximum average PSD of these carriers with dynamic power sharing. Conversely, the A-MPR in the first and second further embodiments do not have this property, so that the maximum PSD of one of the two carriers can be greater than the maximum average PSD of these carriers with dynamic power sharing. The fact that this property is not satisfied is shown in Appendix 3 and is illustrated in FIG. 10, where FIG. 10 illustrates an exemplary graph 1000 of maximum power spectral density with and without dynamic power sharing, in accordance with the further embodiments.

Figure 10:
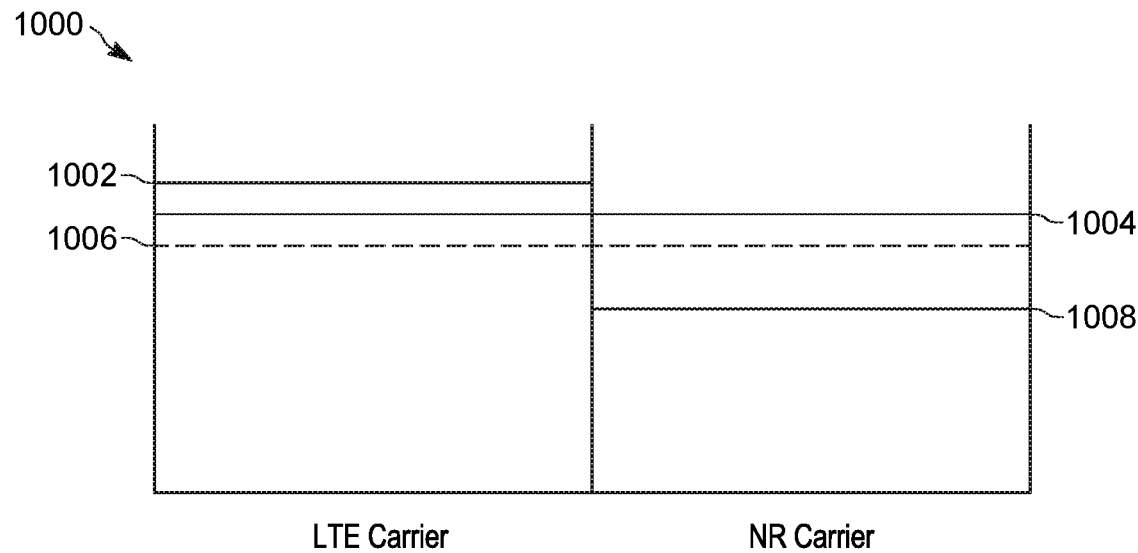
FIG. 10 is an exemplary graph of maximum power spectral density with and without dynamic power sharing, in accordance with further embodiments.

In FIG. 10, level 1004 represents an exemplary maximum average PSD with dynamic power sharing, which depends on both $L_{CRB,NR}$ and $L_{CRB,LTE}$. Level 1002 represents an exemplary maximum PSD without dynamic power sharing, which depends only on $L_{CRB,LTE}$. Level 1008 represents an exemplary maximum PSD without dynamic power sharing, which depends only on $L_{CRB,NR}$. Level 1006 represents an exemplary maximum average PSD (across both carriers) without dynamic power sharing. In the further embodiment, the maximum PSD of either the LTE carrier 1002 or the NR carrier 1008 may be greater than the maximum average PSD with dynamic power sharing, but the maximum average PSD (across both carriers) is less than the maximum average PSD with dynamic power sharing. Thus, the A-MPR in the further embodiments will be sufficient to meet emissions requirements if the equal PSD condition is the worst case for meeting emissions.

As such, the further embodiments, presented herein are able to reduce A-MPR for DC_(n)71AA in the absence of dynamic power sharing. The first embodiment determines the worst case allocation based on the sum of two terms rather than selecting two different worst case allocations for the two terms. The further embodiments use the worst case allocation to determine the remaining power and then applies a fixed partition to the remaining power independent of the allocation. Both methods significantly reduce A-MPR though the A-MPR reduction with the further embodiment may produce better results. The first embodiment has the advantage that the maximum PSD for each carrier is less than the maximum average PSD with dynamic power sharing. However, if equal PSD is believed to be the worst case for deriving the A-MPR needed to meet emissions requirements, then the further embodiments offer still further benefits since the A-MPR reduction is greater still. Since both sets of embodiments reduce A-MPR for DC_(n)71AA without dynamic power sharing, one would enjoy the benefits of better A-MPR whether employing one or both of the embodiments discussed above.

Figure 11:
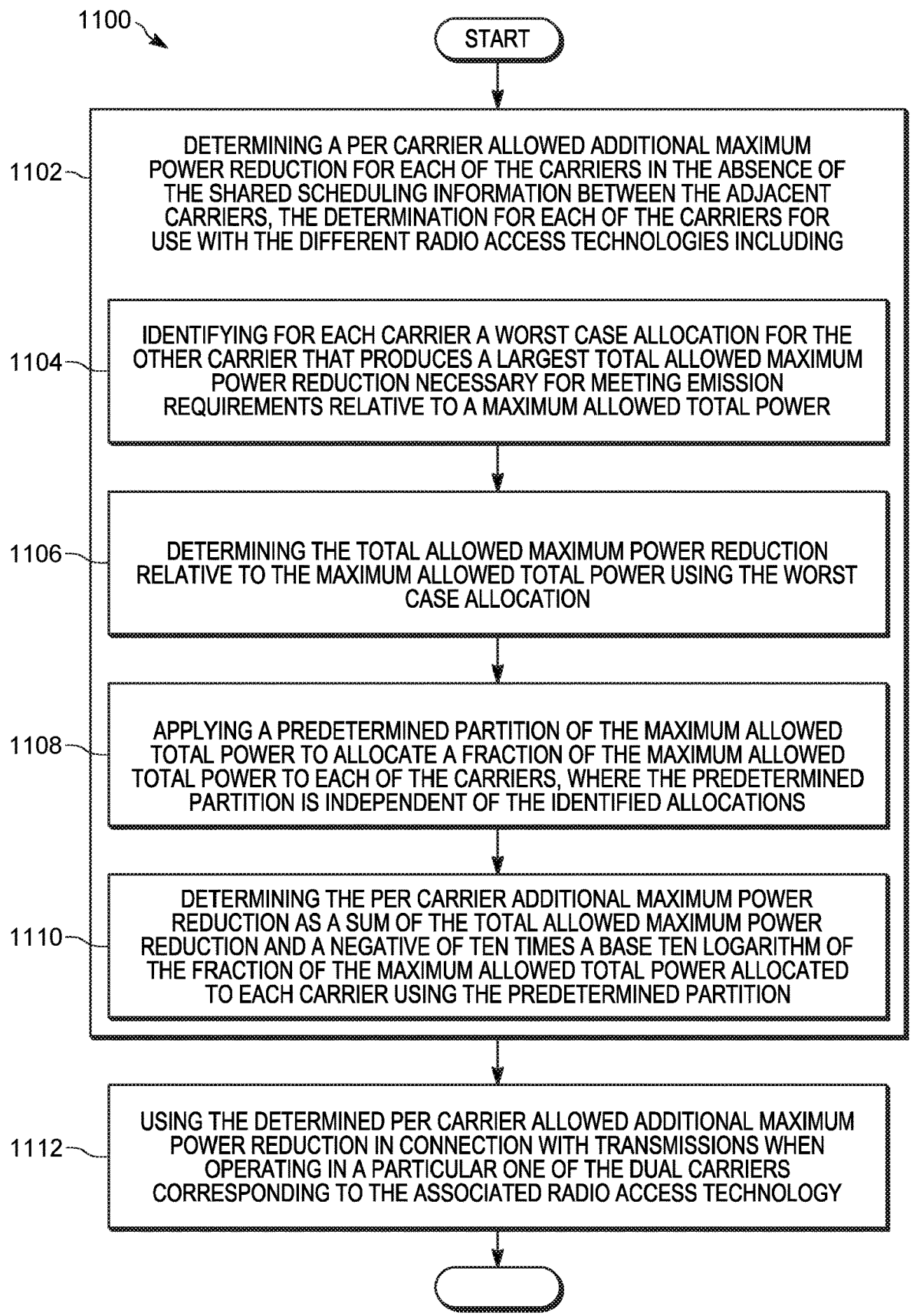
FIG. 11 is a flow diagram in a user equipment for determining a per carrier additional maximum power reduction needed by the user equipment in order to meet emission requirements for dual carrier operation of adjacent carriers in absence of shared scheduling information between the adjacent carriers.

FIG. 11 illustrates a flow diagram 1100 in a user equipment for determining a per carrier additional maximum power reduction needed by the user equipment in order to meet emission requirements for dual carrier operation of adjacent carriers in absence of shared scheduling information between the adjacent carriers, each carrier having an associated respective one of multiple different radio access technologies. The method includes determining 1102 a per carrier allowed additional maximum power reduction for each of the carriers in the absence of the shared scheduling information between the adjacent carriers. The determination 1102 for each of the carriers for use with the different radio access technologies includes identifying 1104 for each carrier a worst case allocation for the other carrier that produces a largest total allowed maximum power reduction necessary for meeting emission requirements relative to a maximum allowed total power, and determining 1106 the total allowed maximum power reduction relative to the maximum allowed total power using the worst case allocation. A predetermined partition of the maximum allowed total power to allocate a fraction of the maximum allowed total power is applied 1108 to each of the carriers, where the predetermined partition is independent of the identified allocations, and the per carrier additional maximum power reduction is determined 1110 as a sum of the total allowed maximum power reduction and a negative of ten times a base ten logarithm of the fraction of the maximum allowed total power allocated to each carrier using the predetermined partition. The method further includes using 1112 the determined per carrier allowed additional maximum power reduction in connection with transmissions when operating in a particular one of the dual carriers corresponding to the associated radio access technology.

In some instances, the predetermined partition includes a fixed partition. In some of these instances, the fixed partition is based upon a carrier bandwidth ratio of each of the carriers, which are part of the dual carrier operation, that has the associated respective one of the multiple different radio access technologies.

In some instances, one of the multiple different radio access technologies includes a radio access technology implementing orthogonal frequency division multiplexing. In some of these instances, the radio access technology implementing orthogonal frequency division multiplexing includes a radio access technology implementing fifth generation New Radio (NR).

In some instances, one of the multiple different radio access technologies includes a radio access technology implementing discrete Fourier transform spread orthogonal frequency division multiplexing. In some of these instances, the radio access technology implementing discrete Fourier transform spread orthogonal frequency division multiplexing includes a radio access technology implementing fifth generation New Radio (NR). In some of these instances, the radio access technology implementing discrete Fourier transform spread orthogonal frequency division multiplexing includes a radio access technology implementing fourth generation Long Term Evolution (LTE).

In some instances, the multiple different radio access technologies includes a radio access technology implementing fourth generation Long Term Evolution (LTE), and a radio access technology implementing fifth generation New Radio (NR).

In some of these instances, the determined per carrier allowed additional maximum power reduction for the LTE carrier is given by $$M_{A,LTE} = M_{A,DC}\left(\frac{L_{CRB,LTE}+1}{N_{RB,LTE}+N_{RB,NR}}\right) - 10\log_{10}\left(\frac{N_{RB,LTE}}{N_{RB,LTE}+N_{RB,NR}}\right)$$

and the the determined per carrier allowed additional maximum power reduction for the NR carrier is given by $$M_{A,NR} = M_{A,DC}\left(\frac{L_{CRB,NR}+1}{N_{RB,LTE}+N_{RB,NR}}\right) - 10\log_{10}\left(\frac{N_{RB,NR}}{N_{RB,LTE}+N_{RB,NR}}\right).$$

In other instances, the determined per carrier allowed additional maximum power reduction for the LTE carrier is given by $$M_{A,LTE} = M_{A,DC}\left(\frac{L_{CRB,LTE}+1}{N_{RB,LTE}+N_{RB,NR}}\right) + 3.$$

and the determined per carrier allowed additional maximum power reduction for the NR carrier is given by $$M_{A,NR} = M_{A,DC}\left(\frac{L_{CRB,NR}+1}{N_{RB,LTE}+N_{RB,NR}}\right) + 3.$$

In some instances, the determined allowed additional maximum power reduction is used in a user equipment in connection with an uplink communication with a network base station.

Figure 12:
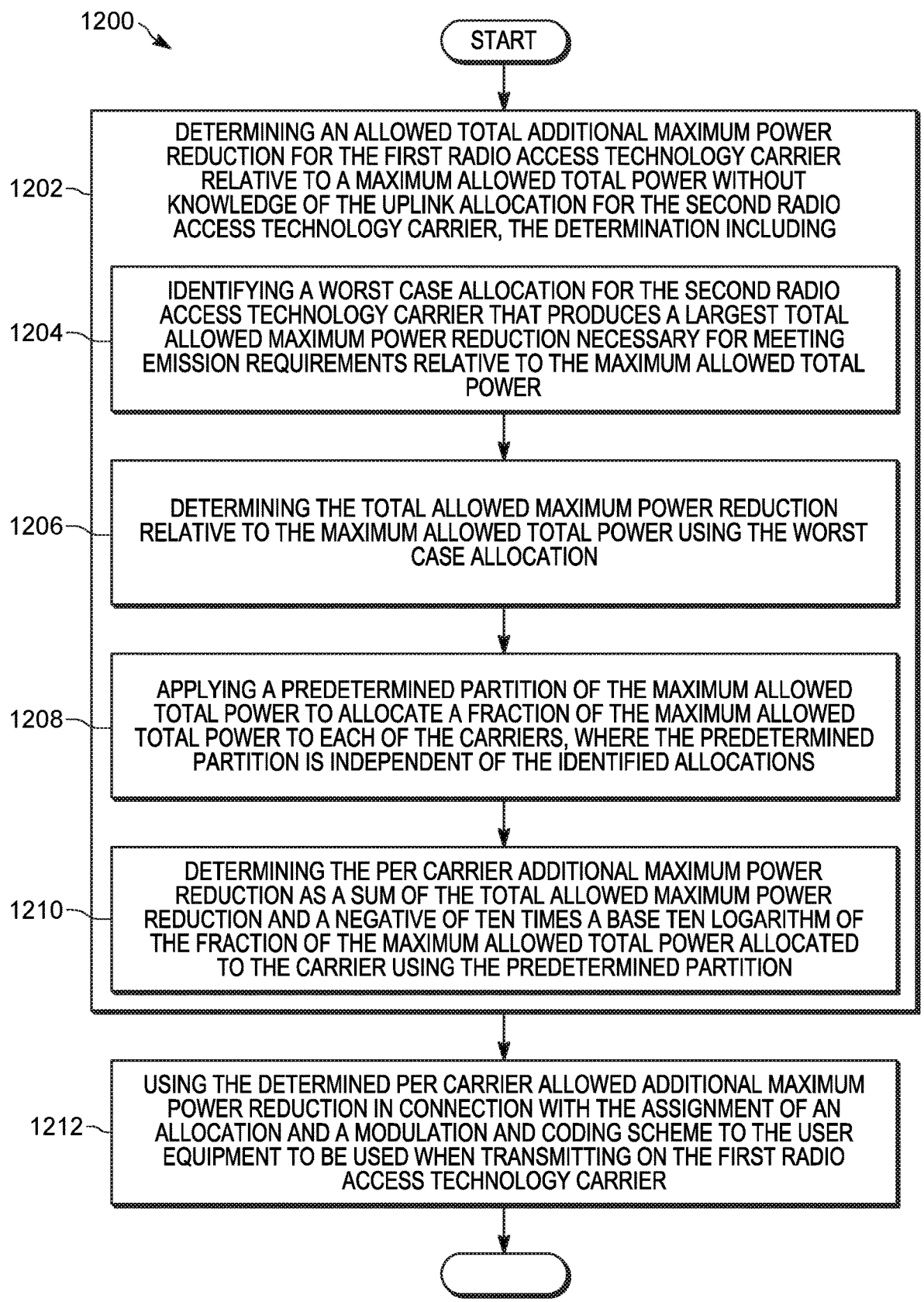
FIG. 12 is a flow diagram in a network entity for a first radio access technology in a communication network for determining a per carrier additional maximum power reduction for a first radio access technology carrier of a dual carrier operation user equipment, where the dual carriers are adjacent uplink carriers corresponding to different radio access technologies, and where the network entity does not have knowledge of the uplink allocation for a second radio access technology carrier associated with the dual carrier operation.

FIG. 12 illustrates a flow diagram 1200 of a method in a network entity for a first radio access technology in a communication network for determining a per carrier additional maximum power reduction for a first radio access technology carrier of a dual carrier operation user equipment, where the dual carriers are adjacent uplink carriers corresponding to different radio access technologies, and where the network entity does not have knowledge of the uplink allocation for a second radio access technology carrier associated with the dual carrier operation, which is different from the first radio access technology carrier is provided. The method includes determining 1202 an allowed total additional maximum power reduction for the first radio access technology carrier relative to a maximum allowed total power without knowledge of the uplink allocation for the second radio access technology carrier. The determination includes identifying 1204 a worst case allocation for the second radio access technology carrier that produces a largest total allowed maximum power reduction necessary for meeting emission requirements relative to the maximum allowed total power, and determining 1206 the total allowed maximum power reduction relative to the maximum allowed total power using the worst case allocation. A predetermined partition of the maximum allowed total power to allocate a fraction of the maximum allowed total power is applied 1208 to each of the carriers, where the predetermined partition is independent of the identified allocations, and the per carrier additional maximum power reduction is determined 1210 as a sum of the total allowed maximum power reduction and a negative of ten times a base ten logarithm of the fraction of the maximum allowed total power allocated to the carrier using the predetermined partition. The method further includes using 1212 the determined per carrier allowed additional maximum power reduction in connection with the assignment of an allocation and a modulation and coding scheme to the user equipment to be used when transmitting on the first radio access technology carrier.

Figure 13:
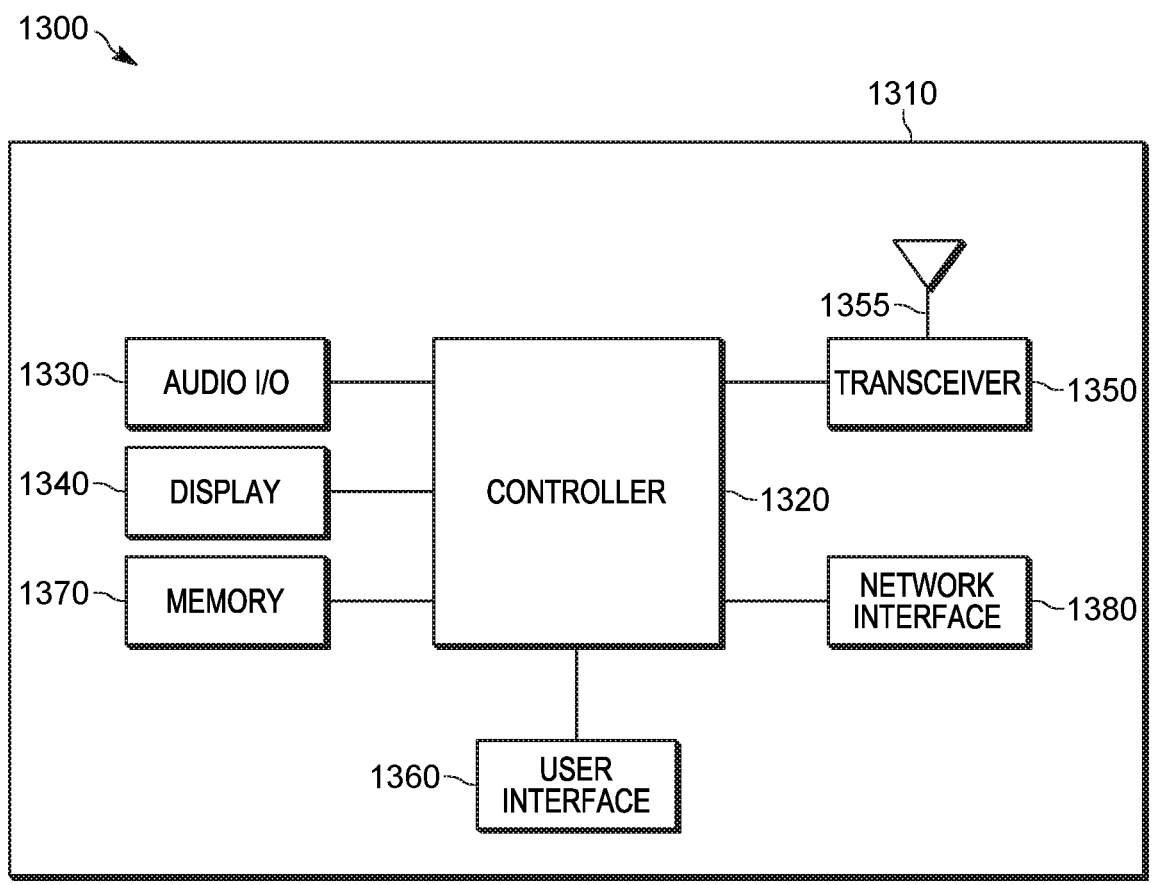
FIG. 13 is an example block diagram of an apparatus according to a possible embodiment.

FIG. 13 illustrates an example block diagram of an apparatus 1300, such as the wireless communication device 110, according to a possible embodiment. The apparatus 1300 can include a housing 1310, a controller 1320 within the housing 1310, audio input and output circuitry 1330 coupled to the controller 1320, a display 1340 coupled to the controller 1320, a transceiver 1350 coupled to the controller 1320, an antenna 1355 coupled to the transceiver 1350, a user interface 1360 coupled to the controller 1320, a memory 1370 coupled to the controller 1320, and a network interface 1380 coupled to the controller 1320. The apparatus 1300 can perform the methods described in all the embodiments.

The display 1340 can be a viewfinder, a liquid crystal display (LCD), a light emitting diode (LED) display, a plasma display, a projection display, a touch screen, or any other device that displays information. The transceiver 1350 can include a transmitter and/or a receiver. The audio input and output circuitry 1330 can include a microphone, a speaker, a transducer, or any other audio input and output circuitry. The user interface 1360 can include a keypad, a keyboard, buttons, a touch pad, a joystick, a touch screen display, another additional display, or any other device useful for providing an interface between a user and an electronic device. The network interface 1380 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1370 can include a random access memory, a read only memory, an optical memory, a solid state memory, a flash memory, a removable memory, a hard drive, a cache, or any other memory that can be coupled to an apparatus.

The apparatus 1300 or the controller 1320 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1370 or elsewhere on the apparatus 1300. The apparatus 1300 or the controller 1320 may also use hardware to implement disclosed operations. For example, the controller 1320 is may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1320 may be any controller or processor device or devices capable of operating an apparatus and implementing the disclosed embodiments. Some or all of the additional elements of the apparatus 1300 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first", "second", and the like may be used solely to distinguish one entity or action from another entity or action without necessarily requiring or implying any actual such relationship or order between such entities or actions. The phrase "at least one of", "at least one selected from the group of", or "at least one selected from" followed by a list is defined to mean one, some, or all, but not necessarily all of, the elements in the list. The terms "comprises", "comprising", "including", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that comprises the element. Also, the term "another" is defined as at least a second or more. The terms "including", "having", and the like, as used herein, are defined as "comprising". Furthermore, the background section is written as the inventor's own understanding of the context of some embodiments at the time of filing and includes the inventor's own recognition of any problems with existing technologies and/or problems experienced in the inventor's own work.

Appendix 1: Derivation of Worst Case Allocation Without Dynamic Power Sharing

For OFDM, the A-MPR for an allocation ratio A in the range $0<A\le0.3$, the worst case non-dynamic power sharing A-MPR is given by $$\max_{L_{CRB,NR} \le N_{RB,NR}, 0<A\le0.3} \left\{10 - 11.67\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right)\right\}$$

Taking the derivative with respect to $L_{CRB,NR}$ and setting equal to 0 yields $$-11.67\left(\frac{1}{N_{RB,LTE} + N_{RB,NR}}\right) + \frac{10}{\ln(10)(L_{CRB,LTE} + L_{CRB,NR})} = 0$$

so that the A-MPR is maximized when $$A = \frac{L_{CRB,LTE} + L_{CRB,NR}}{N_{RB,LTE} + N_{RB,NR}} = \frac{10}{11.67 \cdot \ln(10)} = 0.37$$

Since 0.37 is greater than 0.3, it follows that $$10 - 11.67\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right)$$

is monotonically increasing with $L_{CRB,NR}$ on the interval $0<A\le0.3$.

For A in the range $0.3<A\le0.8$, the non-dynamic power sharing A-MPR is given by $$\max_{L_{CRB,NR} \le N_{RB,NR}, 0.3<A\le0.8} \left\{7.1 - 2\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right)\right\}$$

Taking the derivative with respect to $L_{CRB,NR}$ and setting equal to 0 yields $$-2\left(\frac{1}{N_{RB,LTE} + N_{RB,NR}}\right) + \frac{10}{\ln(10)(L_{CRB,LTE} + L_{CRB,NR})} = 0$$

so that the A-MPR is maximized when $$A = \frac{L_{CRB,LTE} + L_{CRB,NR}}{N_{RB,LTE} + N_{RB,NR}} = \frac{10}{2 \cdot \ln(10)} = 2.17$$

Since 2.17 is greater than 0.8, it follows that $$7.1 - 2\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right)$$

is monotonically increasing with $L_{CRB,NR}$ for A on the interval $0.3<A\le0.8$.

Finally, for A in the range $0.8<A\le1$, the non-dynamic power sharing A-MPR is given by $$\max_{L_{CRB,NR} \le N_{RB,NR}, 0.8<A\le1} \left\{5.5 - 10\log_{10}\left(\frac{L_{CRB,LTE}}{L_{CRB,LTE} + L_{CRB,NR}}\right)\right\}$$

which is clearly monotonically increasing with $L_{CRB,NR}$ for A on the interval $0.8<A\le1$ since only the second term depends on $L_{CRB,NR}$.

From the analysis of the three regions given above, it follows that for OFDM $$\max_{L_{CRB,NR} \leq N_{RB,NR}} \left\{ M_{A,DC}\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right) \right\}$$

increases monotonically with $L_{CRB,NR}$ for A in the interval $0 < A \leq 1$. Thus, the worst case A-MPR results when $$L_{CRB,NR} = N_{RB,NR}$$

so that the worst-case A-MPR is given by $$M_{A,DC}\left(\frac{L_{CRB,LTE} + N_{RB,NR}}{N_{RB,LTE} + N_{RB,NR}}\right) - 10\log_{10}\left(\frac{L_{CRB,LTE}}{L_{CRB,LTE} + N_{RB,NR}}\right)$$

which is significantly less than the value currently in the specification which is given by $$M_{A,DC}\left(\frac{L_{CRB,LTE} + 1}{N_{RB,LTE} + N_{RB,NR}}\right) - 10\log_{10}\left(\frac{L_{CRB,LTE}}{L_{CRB,LTE} + N_{RB,NR}}\right)$$

A similar analysis can be performed for DFT-S-OFDM. For an allocation ratio A in the range $0 < A \leq 0.3$, the worst case non-dynamic power sharing A-MPR is given by $$M_{A,LTE} = \max_{L_{CRB,NR} \leq N_{RB,NR}, 0 < A \leq 0.3} \left\{ 10 - 13.33\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right) \right\}$$

Taking the derivative with respect to $L_{CRB,NR}$ and setting equal to 0 yields $$-13.33\left(\frac{1}{N_{RB,LTE} + N_{RB,NR}}\right) + \frac{10}{\ln(10)(L_{CRB,LTE} + L_{CRB,NR})} = 0$$

so that the A-MPR is maximized when $$A = \frac{L_{CRB,LTE} + L_{CRB,NR}}{N_{RB,LTE} + N_{RB,NR}} = \frac{10}{13.33 \cdot \ln(10)} = 0.33$$

Since 0.33 is greater than 0.3, if follows that $$10 - 13.33\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right)$$

is monotonically increasing with $L_{CRB,NR}$ for A the interval $0 < A \leq 0.3$.

For A in the range $0.3 < A \leq 0.6$, the non-dynamic power sharing A-MPR is given by $$\max_{L_{CRB,NR} \leq N_{RB,NR}, 0.3 < A \leq 0.6} \left\{ 7 - 3.33\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right) \right\}$$

Taking the derivative with respect to $L_{CRB,NR}$ and setting equal to 0 yields $$-3.33\left(\frac{1}{N_{RB,LTE} + N_{RB,NR}}\right) + \frac{10}{\ln(10)(L_{CRB,LTE} + L_{CRB,NR})} = 0$$

so that the A-MPR is maximized when $$A = \frac{L_{CRB,LTE} + L_{CRB,NR}}{N_{RB,LTE} + N_{RB,NR}} = \frac{10}{3.33 \cdot \ln(10)} = 1.30$$

Since 1.30 is greater than 0.6, it follows that $$7 - 2\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right)$$

is monotonically increasing with $L_{CRB,NR}$ for A on the interval $0.3 < A \leq 0.8$.

Finally, for A in the range $0.6 < A \leq 1$, the non-dynamic power sharing A-MPR is given by $$\max_{L_{CRB,NR} \leq N_{RB,NR}, 0.6 < A \leq 1} \left\{ 5 - 10\log_{10}\left(\frac{L_{CRB,LTE}}{L_{CRB,LTE} + L_{CRB,NR}}\right) \right\}$$

which is clearly monotonically increasing with $L_{CRB,NR}$ for A on the interval $0.6 < A \leq 1$ since only the second term depends on $L_{CRB,NR}$.

From the analysis of the three regions given above, it follows that for DFT-S-OFDM $$\max_{L_{CRB,NR} \leq N_{RB,NR}} \left\{ M_{A,DC}\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right) \right\}$$

is monotonically increasing for A in the interval $0 < A \leq 1$. Thus, the worst case A-MPR results when $$L_{CRB,NR} = N_{RB,NR}$$

so that the worst-case A-MPR is given by $$M_{A,DC}\left(\frac{L_{CRB,LTE} + L_{RB,NR}}{N_{RB,LTE} + N_{RB,NR}}\right) - 10\log_{10}\left(\frac{L_{CRB,LTE}}{L_{CRB,LTE} + N_{RB,NR}}\right)$$

Appendix 2: Maximum PSD for a First Embodiment

With the first embodiment, the maximum power spectral density of each carrier will be less than or equal to the maximum power spectral density that is allowed with dynamic power spectral sharing as shown below. With dynamic power sharing, the maximum PSD of the LTE carrier (in dBm per RB) is given by $$P_{EN\text{-}DC} - \left( M_{A,DC}\left( \frac{L_{CRB,LTE} + L_{CRB,NR}}{N_{RB,LTE} + N_{RB,NR}} \right) - 10\log_{10}\left( \frac{L_{CRB,LTE}}{L_{CRB,LTE} + L_{CRB,NR}} \right) \right) -$$
$$10\log_{10}(L_{CRB,LTE}) =$$
$$P_{EN\text{-}DC} - M_{A,DC}\left( \frac{L_{CRB,LTE} + L_{CRB,NR}}{N_{RB,LTE} + N_{RB,NR}} \right) + 10\log_{10}\left( \frac{1}{L_{CRB,LTE} + L_{CRB,NR}} \right)$$

which is the same as the maximum PSD for the NR carrier. We next consider the maximum PSD with the A-MPR in the first embodiment. For the LTE carrier, the maximum PSD is given by $$P_{EN\text{-}DC} - \left( M_{A,DC}\left( \frac{L_{CRB,LTE} + N_{RB,NR}}{N_{RB,LTE} + N_{RB,NR}} \right) - 10\log_{10}\left( \frac{L_{CRB,LTE}}{L_{CRB,LTE} + N_{RB,NR}} \right) \right) -$$
$$10\log_{10}(L_{CRB,LTE}) =$$
$$P_{EN\text{-}DC} - M_{A,DC}\left( \frac{L_{CRB,LTE} + N_{RB,NR}}{N_{RB,LTE} + N_{RB,NR}} \right) + 10\log_{10}\left( \frac{1}{L_{CRB,LTE} + N_{RB,NR}} \right)$$

If we subtract the maximum PSD without from the first embodiment from the maximum PSD with dynamic power sharing for the LTE carrier, we get the expression $$M_{A,DC}\left( \frac{L_{CRB,LTE} + N_{RB,NR}}{N_{RB,LTE} + N_{RB,NR}} \right) - 10\log_{10}\left( \frac{L_{CRB,LTE}}{L_{CRB,LTE} + N_{RB,NR}} \right) -$$
$$\left( M_{A,DC}\left( \frac{L_{CRB,LTE} + L_{CRB,NR}}{N_{RB,LTE} + N_{RB,NR}} \right) - 10\log_{10}\left( \frac{L_{CRB,LTE}}{L_{CRB,LTE} + L_{CRB,NR}} \right) \right)$$

Now because we previously shown that the following expression is monotonically increasing with $L_{CRB,LTE}$ for A in the interval $0 < A \le 1$ $$M_{A,DC}\left( \frac{L_{CRB,LTE} + L_{CRB,NR}}{N_{RB,LTE} + N_{RB,NR}} \right) - 10\log_{10}\left( \frac{L_{CRB,LTE}}{L_{CRB,LTE} + L_{CRB,NR}} \right),$$

it follows that $$M_{A,DC}\left( \frac{L_{CRB,LTE} + N_{RB,NR}}{N_{RB,LTE} + N_{RB,NR}} \right) - 10\log_{10}\left( \frac{L_{CRB,LTE}}{L_{CRB,LTE} + N_{RB,NR}} \right) \ge$$
$$M_{A,DC}\left( \frac{L_{CRB,LTE} + L_{CRB,NR}}{N_{RB,LTE} + N_{RB,NR}} \right) - 10\log_{10}\left( \frac{L_{CRB,LTE}}{L_{CRB,LTE} + L_{CRB,NR}} \right)$$

and thus the maximum PSD for the LTE carrier for the first embodiment is less than or equal to the maximum average PSD with dynamic power sharing. In exactly same manner, it can be shown that the maximum PSD for the NR carrier in the first embodiment is less than or equal to the maximum average PSD with dynamic power sharing.

Appendix 3: Maximum PSD for a First One of the Further Embodiments

With the first one of the further embodiments, the maximum transmit power without dynamic power sharing will always be less than the maximum transmit power with dynamic power sharing. However, it is possible that the maximum power spectral density on one (but not both) of the carriers may be greater for the maximum average power spectral density with dynamic power sharing as is shown below.

For the dynamic power sharing case, the PSD for the LTE carrier is given by $$P_{EN\text{-}DC} - \left( M_{A,DC}\left( \frac{L_{CRB,LTE} + L_{CRB,NR}}{N_{RB,LTE} + N_{RB,NR}} \right) - 10\log_{10}\left( \frac{L_{CRB,NR}}{L_{CRB,LTE} + L_{CRB,NR}} \right) \right) -$$
$$10\log_{10}(L_{CRB,NR}) =$$
$$P_{EN\text{-}DC} - M_{A,DC}\left( \frac{L_{CRB,LTE} + L_{CRB,NR}}{N_{RB,LTE} + N_{RB,NR}} \right) + 10\log_{10}\left( \frac{1}{L_{CRB,LTE} + L_{CRB,NR}} \right)$$

With the A-MPR in from the first of the further embodiments, the PSD for the LTE carrier is given by $$P_{EN\text{-}DC} - \left( M_{A,DC}\left( \frac{L_{CRB,LTE} + 1}{N_{RB,LTE} + N_{RB,NR}} \right) - 10\log_{10}\left( \frac{N_{CRB,NR}}{N_{CRB,LTE} + N_{CRB,NR}} \right) \right) -$$
$$10\log_{10}(L_{CRB,NR}) = P_{EN\text{-}DC} - M_{A,DC}\left( \frac{L_{CRB,LTE} + 1}{N_{RB,LTE} + N_{RB,NR}} \right) +$$
$$10\log_{10}\left( \frac{N_{CRB,NR}}{N_{CRB,LTE} + N_{CRB,NR} L_{CRB,NR}} \right)$$

If we subtract the maximum PSD in the first of the further embodiments from the maximum PSD with dynamic power sharing, we get the expression $$P_{EN\text{-}DC} - M_{A,DC}\left( \frac{L_{CRB,LTE} + L_{CRB,NR}}{N_{RB,LTE} + N_{RB,NR}} \right) +$$
$$10\log_{10}\left( \frac{1}{L_{CRB,LTE} + L_{CRB,NR}} \right) - \left( P_{EN\text{-}DC} - M_{A,DC}\left( \frac{L_{CRB,LTE} + 1}{N_{RB,LTE} + N_{RB,NR}} \right) + \right.$$
$$\left. 10\log_{10}\left( \frac{N_{CRB,NR}}{(N_{CRB,LTE} + N_{CRB,NR})L_{CRB,NR}} \right) \right) =$$
$$M_{A,DC}\left( \frac{L_{CRB,LTE} + 1}{N_{RB,LTE} + N_{RB,NR}} \right) - M_{A,DC}\left( \frac{L_{CRB,LTE} + L_{CRB,NR}}{N_{RB,LTE} + N_{RB,NR}} \right) +$$
$$10\log_{10}\left( \frac{L_{CRB,NR}}{L_{CRB,LTE} + L_{CRB,NR}} \cdot \frac{N_{CRB,LTE} + N_{CRB,NR}}{N_{CRB,NR}} \right)$$

The combination of the first two terms of this expression $$M_{A,DC}\left( \frac{L_{CRB,LTE} + 1}{N_{RB,LTE} + N_{RB,NR}} \right) - M_{A,DC}\left( \frac{L_{CRB,LTE} + L_{CRB,NR}}{N_{RB,LTE} + N_{RB,NR}} \right)$$

is clearly greater than or equal to 0 since $M_{A,DC}(\cdot)$ is non-decreasing with respect to its argument. Now note that the last term is non-negative if $$\frac{N_{CRB,LTE} + N_{CRB,NR}}{N_{CRB,NR}} \ge \frac{L_{CRB,LTE} + L_{CRB,NR}}{L_{CRB,NR}}$$

and is otherwise negative. In the case that $$M_{A,DC}\left(\frac{L_{CRB,LTE}+1}{N_{RB,LTE}+N_{RB,NR}}\right) - M_{A,DC}\left(\frac{L_{CRB,LTE}+L_{CRB,NR}}{N_{RB,LTE}+N_{RB,NR}}\right) \leq$$
$$-10\log_{10}\left(\frac{L_{CRB,NR}}{L_{CRB,LTE}+L_{CRB,NR}} \cdot \frac{N_{CRB,LTE}+N_{CRB,NR}}{N_{CRB,NR}}\right),$$

then the maximum PSD for the LTE carrier is larger in the first of the further embodiments, and is higher than the maximum average PSD with dynamic power sharing. Following this same analysis, it can be shown that the maximum PSD for the NR carrier is larger than the maximum average PSD with power sharing if $$M_{A,DC}\left(\frac{L_{CRB,NR}+1}{N_{RB,LTE}+N_{RB,NR}}\right) - M_{A,DC}\left(\frac{L_{CRB,LTE}+L_{CRB,NR}}{N_{RB,LTE}+N_{RB,NR}}\right) \leq$$
$$-10\log_{10}\left(\frac{L_{CRB,LTE}}{L_{CRB,LTE}+L_{CRB,NR}} \cdot \frac{N_{CRB,LTE}+N_{CRB,NR}}{N_{CRB,LTE}}\right).$$

What is claimed is:

1. A method in a user equipment for determining a per carrier additional maximum power reduction needed by the user equipment in order to meet emission requirements for dual carrier operation of adjacent carriers in absence of shared scheduling information between the adjacent carriers, each carrier having an associated respective one of multiple different radio access technologies, the method comprising:
   determining a per carrier allowed additional maximum power reduction for each of the carriers in the absence of the shared scheduling information between the adjacent carriers, the determination for each of the carriers for use with the different radio access technologies including
      identifying for each carrier a worst case allocation for the other carrier that produces a largest total allowed maximum power reduction necessary for meeting emission requirements relative to a maximum allowed total power,
      determining the total allowed maximum power reduction relative to the maximum allowed total power using the worst case allocation,
      applying a predetermined partition of the maximum allowed total power to allocate a fraction of the maximum allowed total power to each of the carriers, where the predetermined partition is independent of the identified allocations, and
      determining the per carrier additional maximum power reduction as a sum of the total allowed maximum power reduction and a negative of ten times a base ten logarithm of the fraction of the maximum allowed total power allocated to each carrier using the predetermined partition; and
   using the determined per carrier allowed additional maximum power reduction in connection with transmissions when operating in a particular one of the dual carriers corresponding to the associated radio access technology.

2. A method in accordance with claim 1, wherein the predetermined partition includes a fixed partition.

3. A method in accordance with claim 2, wherein the fixed partition is based upon a carrier bandwidth ratio of each of the carriers, which are part of the dual carrier operation, that has the associated respective one of the multiple different radio access technologies.

4. A method in accordance with claim 1, wherein one of the multiple different radio access technologies includes a radio access technology implementing orthogonal frequency division multiplexing.

5. A method in accordance with claim 4, wherein the radio access technology implementing orthogonal frequency division multiplexing includes a radio access technology implementing fourth generation Long Term Evolution (LTE).

6. A method in accordance with claim 1, wherein one of the multiple different radio access technologies includes a radio access technology implementing discrete Fourier transform spread orthogonal frequency division multiplexing.

7. A method in accordance with claim 6, wherein the radio access technology implementing discrete Fourier transform spread orthogonal frequency division multiplexing includes a radio access technology implementing fifth generation New Radio (NR).

8. A method in accordance with claim 1, wherein the multiple different radio access technologies includes a radio access technology implementing fourth generation Long Term Evolution (LTE), and a radio access technology implementing fifth generation New Radio (NR).

9. A method in accordance with claim 8, wherein the determined per carrier allowed additional maximum power reduction for the LTE carrier is given by $$M_{A,LTE} = M_{A,DC}\left(\frac{L_{CRB,LTE}+1}{N_{RB,LTE}+N_{RB,NR}}\right) - 10\log_{10}\left(\frac{N_{RB,LTE}}{N_{RB,LTE}+N_{RB,NR}}\right).$$

10. A method in accordance with claim 8, wherein the determined per carrier allowed additional maximum power reduction for the NR carrier is given by $$M_{A,NR} = M_{A,DC}\left(\frac{L_{CRB,NR}+1}{N_{RB,LTE}+N_{RB,NR}}\right) - 10\log_{10}\left(\frac{N_{RB,NR}}{N_{RB,LTE}+N_{RB,NR}}\right).$$

11. A method in accordance with claim 8, wherein the determined per carrier allowed additional maximum power reduction for the LTE carrier is given by $$M_{A,LTE} = M_{A,DC}\left(\frac{L_{CRB,LTE}+1}{N_{RB,LTE}+N_{RB,NR}}\right) + 3.$$

12. A method in accordance with claim 8, wherein the determined per carrier allowed additional maximum power reduction for the NR carrier is given by $$M_{A,NR} = M_{A,DC}\left(\frac{L_{CRB,NR}+1}{N_{RB,LTE}+N_{RB,NR}}\right) + 3.$$

13. A method in accordance with claim 1, wherein the determined allowed additional maximum power reduction is used in a user equipment in connection with an uplink communication with a network base station.

14. A user equipment in a communication network, the user equipment comprising:

a controller that determines a per carrier allowed additional maximum power reduction for each carrier of a dual carrier operation of adjacent carriers of different radio access technologies in absence of shared scheduling information between the adjacent carriers, the determination for each of the carriers for use with the different radio access technologies including identifying for each carrier a worst case allocation for the other carrier that produces a largest total allowed power reduction necessary for meeting emission requirements relative to a maximum allowed total power, determining the allowed total maximum power reduction relative to the maximum allowed total power using the worst case allocation, applying a predetermined partition of the maximum allowed total power to allocate a fraction of the maximum allowed total power to each of the carriers, where the predetermined partition is independent of the identified allocations, and determining the per carrier additional maximum power reduction as a sum of the total allowed maximum power reduction and a negative of ten times a base ten logarithm of the fraction of the maximum allowed total power allocated to the carrier using the predetermined partition; and a transceiver that uses the determined per carrier allowed additional maximum power reduction in connection with transmissions when operating in a particular one of the dual carriers corresponding to the associated radio access technology.

15. A user equipment in accordance with claim 14, wherein one of the different radio access technologies includes a radio access technology implementing fourth generation Long Term Evolution (LTE), and another one of the different radio access technologies includes a radio access technology implementing fifth generation New Radio (NR).

16. A user equipment in accordance with claim 15, wherein the determined per carrier additional maximum power reduction for the carrier associated with the fourth generation Long Term Evolution is determined by equation $$M_{A,LTE} = M_{A,DC}\left(\frac{L_{CRB,LTE} + N_{RB,NR}}{N_{RB,LTE} + N_{RB,NR}}\right) - 10\log_{10}\left(\frac{L_{CRB,LTE}}{N_{CRB,LTE} + N_{RB,NR}}\right).$$

17. A user equipment in accordance with claim 15, wherein the determined per carrier additional maximum power reduction for the carrier associated with the fifth generation New Radio is determined by equation $$M_{A,NR} = M_{A,DC}\left(\frac{L_{CRB,NR} + N_{RB,LTE}}{N_{RB,LTE} + N_{RB,NR}}\right) - 10\log_{10}\left(\frac{L_{CRB,NR}}{L_{CRB,NR} + N_{RB,LTE}}\right).$$

18. A user equipment in accordance with claim 15, wherein the determined per carrier allowed additional maximum power reduction for the LTE carrier is given by $$M_{A,LTE} = M_{A,DC}\left(\frac{L_{CRB,LTE} + 1}{N_{RB,LTE} + N_{RB,NR}}\right) + 3.$$

19. A user equipment in accordance with claim 15, wherein the determined per carrier allowed additional maximum power reduction for the NR carrier is given by $$M_{A,NR} = M_{A,DC}\left(\frac{L_{CRB,NR} + 1}{N_{RB,LTE} + N_{RB,NR}}\right) + 3.$$

20. A user equipment in accordance with claim 14, wherein determined allowed additional maximum power reduction is used in the user equipment in connection with an uplink communication with a network base station.

* * * * *